United States Patent
Menendez

(10) Patent No.: US 7,809,267 B2
(45) Date of Patent: Oct. 5, 2010

(54) COHERENT GATED RECEIVER

(75) Inventor: Ronald Charles Menendez, Chatham, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 856 days.

(21) Appl. No.: 11/444,763

(22) Filed: Jun. 1, 2006

(65) Prior Publication Data
US 2007/0280692 A1 Dec. 6, 2007

(51) Int. Cl.
*H04J 14/00* (2006.01)
(52) U.S. Cl. .............................. 398/78; 398/77; 398/79
(58) Field of Classification Search ......... 398/202–214, 398/77–79
See application file for complete search history.

(56) References Cited

U.S. PATENT DOCUMENTS

2003/0058504 A1   3/2003   Cho et al.
2004/0091262 A1*  5/2004   Pohjola et al. ................ 398/42
2004/0096226 A1*  5/2004   Hiironen et al. ............. 398/202
2004/0246466 A1* 12/2004   Hunsche .................... 356/73.1
2006/0171722 A1*  8/2006   Toliver ....................... 398/188
2007/0036553 A1*  2/2007   Etemad et al. .............. 398/140

OTHER PUBLICATIONS

Hashimoto et al. Optical clock recovery using optical phase locked loop with voltage controlled mode locked semiconductor laser, ECOC 2004—vol. 3, pp. 376-377.*
International Search Report, dated Aug. 27, 2008 (2 pages).

* cited by examiner

Primary Examiner—Dzung D Tran
(74) Attorney, Agent, or Firm—Philip J. Feig

(57) ABSTRACT

The present invention is directed to a coherent gated receiver. The receiver includes a decoder operable to receive an optical signal and generate a decoded optical signal, the decoder comprises a demultiplexer operable to spatially distribute the optical signal, a phase mask operable to decode the spatially distributed optical signal, and a multiplexer operable to combine the decoded spatially distributed optical signal. The receiver also includes a laser source operable to provide a pulse signal, a combiner coupled to the laser source and the decoder operable to combine the decoded optical signal and the pulse signal, and a detector operable to detect an output from the combiner.

12 Claims, 5 Drawing Sheets

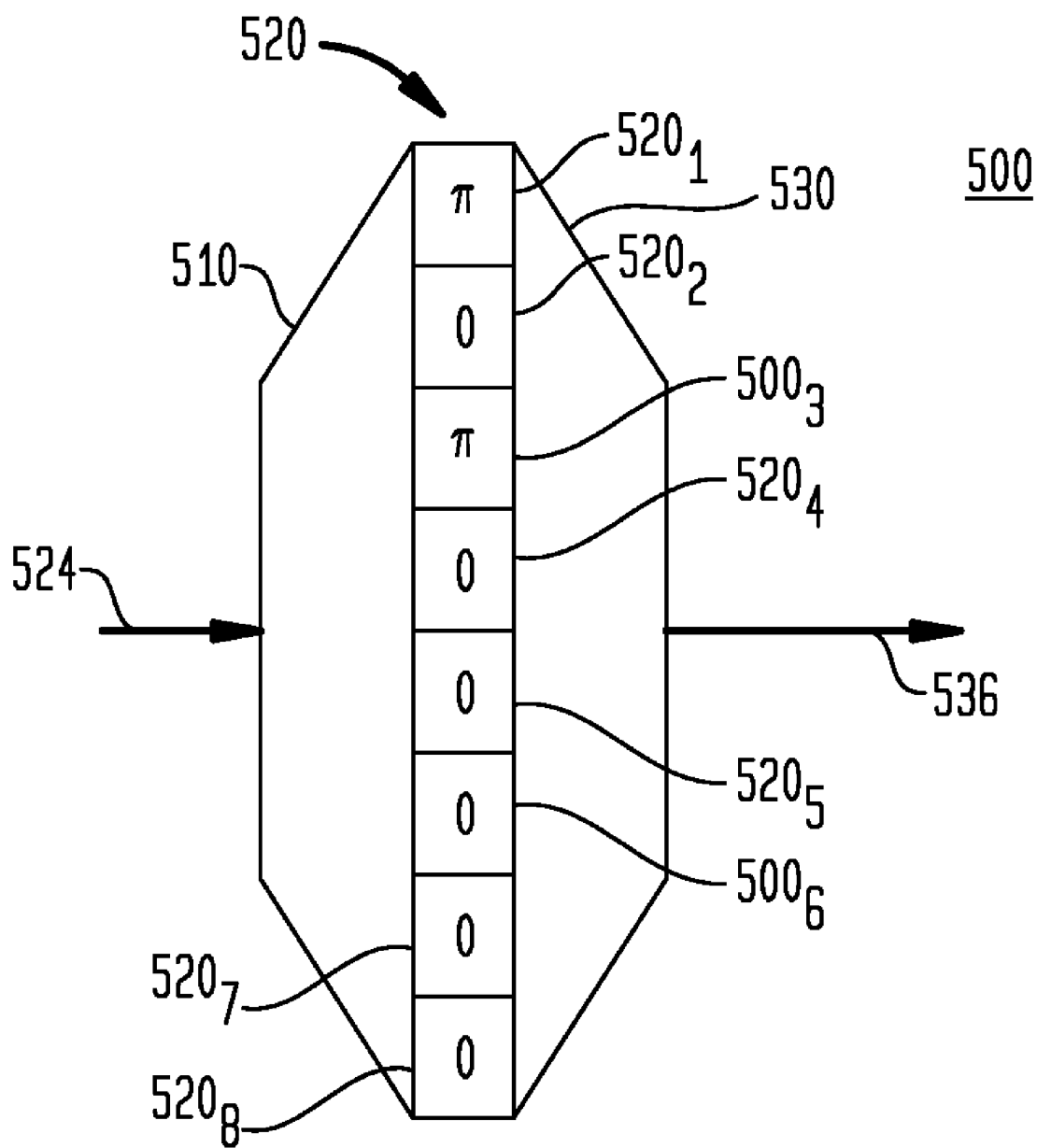

US 7,809,267 B2

COHERENT GATED RECEIVER

STATEMENT REGARDING FEDERALLY SPONSORED RESEARCH

Funding for research was partially provided by the Defense Advanced Research Projects Agency under federal contract MDA972-03-C-0078. The federal government has certain rights in this invention.

FIELD OF THE INVENTION

The present invention is directed to the coherent detection of an Optical Code Division Multiple Access (OCDMA) signal. More specifically, the present invention is directed to a coherent detection approach with increased sensitivity and less receiver complexity.

BACKGROUND OF THE INVENTION

Various communications schemes have been used to increase data throughput and to decrease data error rates as well as to generally improve the performance of communications channels. As an example, frequency division multiple access ("FDMA") employs multiple data streams that are assigned to specific channels disposed at different frequencies of the transmission band. Alternatively, time division multiple access ("TDMA") uses multiple data streams that are assigned to different timeslots in a single frequency of the transmission band. FDMA and TDMA are quite limited in the number of users and/or the data rates that can be supported for a given transmission band.

In many communication architectures, code division multiple access (CDMA) has supplanted FDMA and TDMA. CDMA is a form of spread spectrum communications that enables multiple data streams or channels to share a single transmission band at the same time. The CDMA format is akin to a cocktail party in which multiple pairs of people are conversing with one another at the same time in the same room. Ordinarily, it is very difficult for one party in a conversation to hear the other party if many conversations occur simultaneously. For example, if one pair of speakers is excessively loud, their conversation will drown out the other conversations. Moreover, when different pairs of people are speaking in the same language, the dialogue from one conversation may bleed into other conversations of the same language, causing miscommunication. In general, the cumulative background noise from all the other conversations makes it harder for one party to hear the other party speaking. It is therefore desirable to find a way for everyone to communicate at the same time so that the conversation between each pair, i.e., their "signal", is clear while the "noise" from the conversations between the other pairs is minimized.

The CDMA multiplexing approach is well known and is explained in detail, e.g., in the text "CDMA: Principles of Spread Spectrum Communication," by Andrew Viterbi, published in 1995 by Addison-Wesley. Basically, in CDMA, the bandwidth of the data to be transmitted (user data) is much less than the bandwidth of the transmission band. Unique "pseudonoise" keys are assigned to each channel in a CDMA transmission band. The pseudonoise keys are selected to mimic Gaussian noise (e.g., "white noise") and are also chosen to be maximal length sequences in order to reduce interference from other users/channels. One pseudonoise key is used to modulate the user data for a given channel. This modulation is equivalent to assigning a different language to each pair of speakers at a party.

During modulation, the user data is "spread" across the bandwidth of the CDMA band. That is, all of the channels are transmitted at the same time in the same frequency band. This is equivalent to all of the pairs of partygoers speaking at the same time. The introduction of noise and interference from other users during transmission is inevitable (collectively referred to as "noise"). Due to the nature of the pseudonoise key, the noise is greatly reduced during demodulation relative to the user's signal because when a receiver demodulates a selected channel, the data in that channel is "despread" while the noise is not "despread." Thus, the data is returned to approximately the size of its original bandwidth, while the noise remains spread over the much larger transmission band. The power control for each user can also help to reduce noise from other users. Power control is equivalent to lowering the volume of a loud pair of partygoers.

CDMA has been used commercially in wireless telephone ("cellular") and in other communications systems. Such cellular systems typically operate at between 800 MHz and 2 GHz, though the individual frequency bands may only be a few MHz wide. An attractive feature of cellular CDMA is the absence of any hard limit to the number of users in a given bandwidth, unlike FDMA and TDMA. The increased number of users in the transmission band merely increases the noise to contend with. However, as a practical matter, there is some threshold at which the "signal-to-noise" ratio becomes unacceptable. This signal-to-noise threshold places real constraints in commercial systems on the number of paying customers and/or data rates that can be supported.

CDMA has also been used in optical communications networks. Such optical CDMA (OCDMA) networks generally employ the same general principles as cellular CDMA. However, unlike cellular CDMA, optical CDMA signals are delivered over an optical network. As an example, a plurality of subscriber stations may be interconnected by a central hub with each subscriber station being connected to the hub by a respective bidirectional optical fiber link. Each subscriber station has a transmitter capable of transmitting optical signals, and each station also has a receiver capable of receiving transmitted signals from all of the various transmitters in the network. The optical hub receives optical signals over optical fiber links from each of the transmitters and transmits optical signals over optical fiber links to all of the receivers. An optical pulse is transmitted to a selected one of a plurality of potential receiving stations by coding the pulse in a manner such that it is detectable by the selected receiving station but not by the other receiving stations. Such coding may be accomplished by dividing each pulse into a plurality of intervals known as "chips". Each chip may have the logic value "1", as indicated by relatively large radiation intensity, or may have the logic value "0", as indicated by a relatively small radiation intensity. The chips comprising each pulse are coded with a particular pattern of logic "1"'s and logic "0"'s that is characteristic to the receiving station or stations that are intended to detect the transmission. Each receiving station is provided with optical receiving equipment capable of regenerating an optical pulse when it receives a pattern of chips coded in accordance with its own unique sequence but cannot regenerate the pulse if the pulse is coded with a different sequence or code.

Alternatively, the optical network utilizes CDMA that is based on optical frequency domain coding and decoding of ultra-short optical pulses. Each of the transmitters includes an optical source for generating the ultra-short optical pulses. The pulses comprise N Fourier components whose phases are coherently related to one another. The frequency intervals around each of the N Fourier components are generally referred to as frequency bins. A "signature" is impressed upon the optical pulses by independently phase shifting the individual Fourier components comprising a given pulse in accordance with a particular code whereby the Fourier components comprising the pulse are each phase shifted a different amount in accordance with the particular code. A class of truly orthogonal codes based on Hadamard matrices is of interest in the context of frequency-phase encoded OCDMA. The encoded pulse is then broadcast to all of or a plurality of the receiving systems in the network. Each receiving system is identified by a unique signature template and detects only the pulses provided with a signature that matches the particular receiving system's template.

The concept of coherent detection of optical signals has a long history and has been pursued as a means of increasing detector sensitivity and selectivity. It is the optical analog of heterodyne (or homodyne) detection in radio technology. In typical coherent detection scenarios, several different data streams each modulate different optical carriers and a single-frequency local oscillator laser is tuned to appropriately align with one of the data-modulated carriers to select that one data stream. In OCDMA systems, the several data streams all modulate the same set of optical carriers and are distinguishable only on the basis of their specific code signatures and not on the basis of the signal frequency component on which they are carried. Past proposals to apply coherently detection techniques to OCDMA signals have relied upon one-by-one coherent detection of each of the N frequencies in the OCDMA signal; that is, after the OCDMA signal has been properly decoded to realign the phases of one data signal, each of the N frequencies is isolated from the composite, individually mixed with its corresponding local oscillator (LO) frequency and detected. As shown in FIG. 1, an optical receiver receives an optical signal and demultiplexes such signal using a demultiplexer 110 in order to obtain the N Fourier components or frequency bins. The demultiplexed signal is decoded using decoder 120. At the detector 100, a comparatively high-power (relative to the received optical signal) local oscillator (LO) laser 130 is frequency-tuned relative to the desired carrier and optically mixed with the several modulated carriers and downshifts the frequency of the desired carrier into electrical passband of an opto-electronic detector. Other carriers fall outside this passband and are hence suppressed in the detection process.

Optical mixing typically occurs in 2×2 optical combiners 150. The received signal and LO signal are the two inputs to each combiner and either of the two output ports can be used to detect the downshifted signal. However, a particularly attractive detector arrangement uses a pair of balanced detectors 160 and 170, one for each output port of the combiner. The outputs of the pairs of balanced detectors for each frequency bin are summed using 180 and 190. The outputs of elements 180 and 190 are subtracted from one another to suppress the common mode signals and effectively double the desired detected signal. The balanced detector pairs yield an electrical signal that is proportional to the product of the electric fields of the incoming signal and LO signal.

Previous receivers required a combiner and a pair of detectors for each frequency bin thereby increasing the complexity of a coherent gated detector. As such, there is a need for a coherent gated detector that reduces the complexity of the detector while increasing the sensitivity of the detector.

SUMMARY OF THE INVENTION

An aspect of the invention is directed to a coherent gated receiver. The receiver has a decoder operable to receive an optical signal and generate a decoded optical signal, the decoder comprises a demultiplexer operable to spatially distribute the optical signal, a phase mask operable to decode the spatially distributed optical signal, and a multiplexer operable to combine the decoded spatially distributed optical signal, a local oscillator laser source operable to provide a pulse signal with phase-locked frequency components matching those in the transmitted signal, a combiner coupled to the laser source and the decoder operable to combine the decoded optical signal and the pulse signal, and a detector operable to detect an output from the combiner. This approach preserves the orthogonality between codes enabling other coded signals to be efficiently rejected by the receiver while the desired signal is recovered.

In another aspect of the invention the optical signal is spatially distributed by frequency.

In yet another aspect of the invention, the local oscillator laser source is a mode locked laser.

In yet another aspect of the invention, the coherent gated receiver has a second detector operable to detect an output from the combiner.

In yet another aspect of the invention, the output of the detector and the second detector are subtracted from each other to generate a signal.

In yet another aspect of the invention, the combiner is 2×2 combiner.

In yet another aspect of the invention, a complimentary coherent gated receiver includes a laser source operable to provide a pulse signal, an encoder coupled to the laser source and operable to encode the pulse signal, the encoder comprises, a demultiplexer operable to spatially distribute the pulse signal, a phase mask operable to encode the spatially distributed pulse signal, and a multiplexer operable to combine the encoded spatially distributed pulse signal, a combiner operable to combine the encoded pulse signal and an optical signal, and a detector operable to detect an output from the combiner. Here again, the receiver configuration preserves the code orthogonality that enables other coded signals to be efficiently rejected by the receiver while the desired signal is recovered In yet another aspect of the invention, the pulse signal is spatially distributed by frequency.

In yet another aspect of the invention, the laser source is a mode locked laser.

In yet another aspect of the invention, the coherent gated receiver has a second detector operable to detect an output from the combiner.

In yet another aspect of the invention, the output of the detector and the second detector are subtracted from each other to generate an signal.

In yet another aspect of the invention, the combiner is 2×2 combiner.

BRIEF DESCRIPTION OF THE DRAWINGS

A more complete appreciation of the subject matter of the present invention and the various advantages thereof can be realized by reference to the following detailed description in which reference is made to the accompanying drawings wherein like reference numbers or characters refer to similar elements.

FIG. 5 illustrates a demultiplexer, encoder/decoder, multiplexer in accordance with an aspect of the invention.

DETAILED DESCRIPTION OF THE INVENTION

Figure 1:
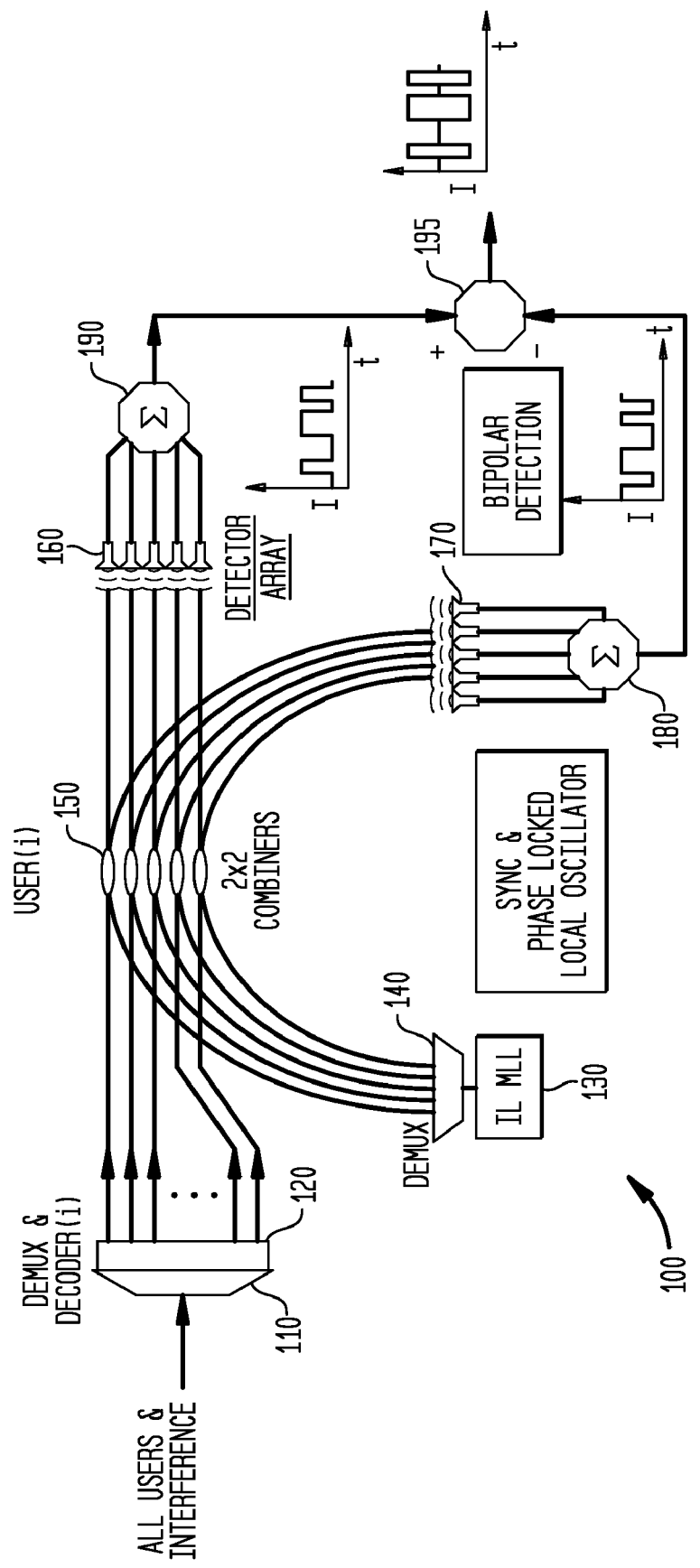
FIG. 1 illustrates a typical detector.
Figure 2:
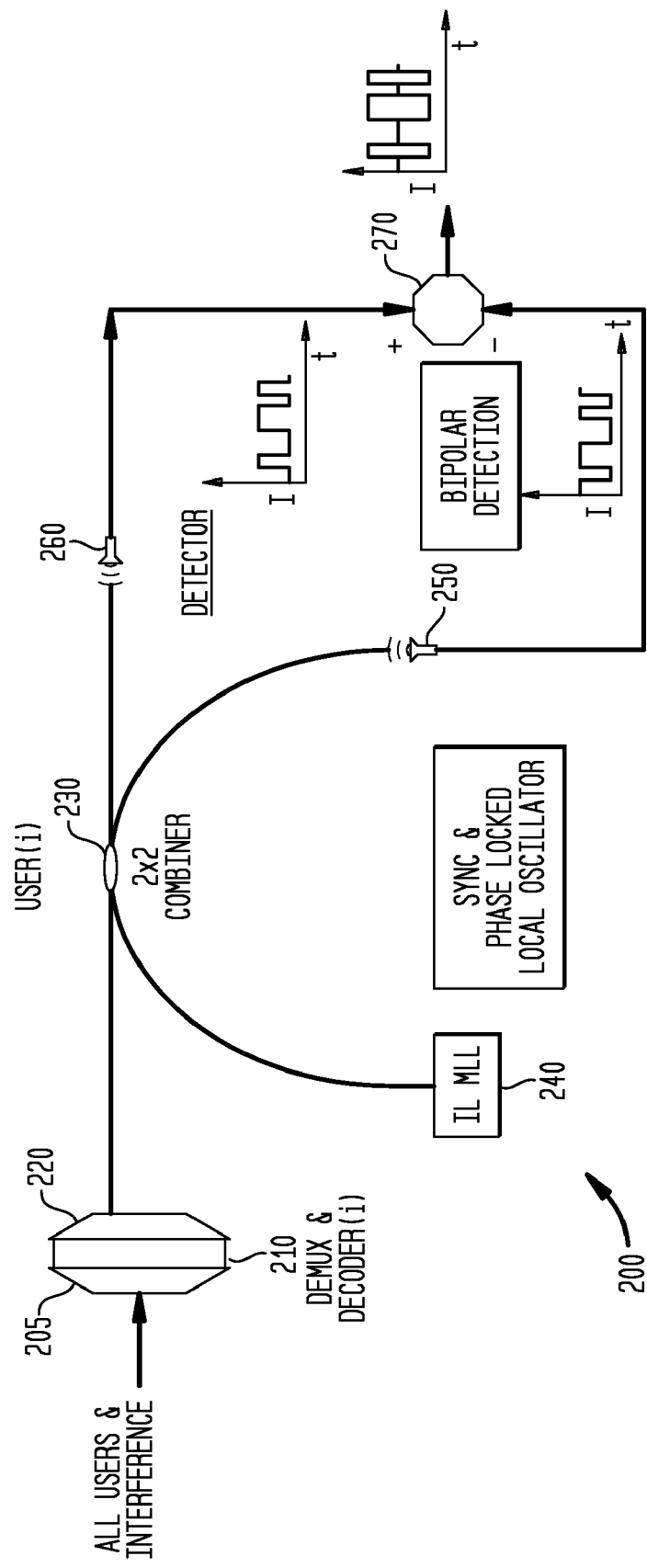
FIG. 2 illustrates a receiver in accordance with an aspect of the invention.

FIG. 2 depicts a receiver 200 in accordance with an aspect of the invention. In receiver 200, an incoming optical signal composed of multiple OCDMA-encoded channels is passed through a demultiplexer 205, decoder 210, and multiplexer 220 whose operation will be described below with regard to FIG. 4. The demultiplexer 205 demultiplexes the incoming optical signal into its separate frequency bins. Each frequency bin is decoded by decoder 210, which is matched to one desired signal from the incoming ensemble of coded channels. After the different frequency components are re-multiplexed together, the desired optical channel is restored to its original pulsed and data-modulated form. The other mismatched channels are not restored to the original pulsed form and, if orthogonal Hadamard codes are used, these undesired signals are instead nulled in the vicinity of the time intervals at which the desired signal is at its peak.

Local oscillator (LO) laser 240, which may be a mode locked laser, produces a pulse signal that is frequency-tuned relative to a desired signal in the optical signal. When the appropriately phased, polarized and time-aligned LO pulse signal is combined with the optical signal in combiner 230, the product of the two signals effectively gates the portion of the optical signal corresponding to the desired signal. The gating of the desired signal occurs because the pulse signal produced by laser 240 is effectively zero outside the center of the pulse and the desired signal is reassembled at the center of the pulse while other data is pushed out of the center.

The outputs of combiner 230 are input to optical detectors 250 and 260. Optical detectors 250 and 260 may be a charge coupled detector (CCD) array, photodiodes, photovoltaics, photodiode array, photomultiplier tube, or any other detector capable of converting incoming light into an electrical signal. The outputs of optical detectors 250 and 260 are subtracted from one another in element 270 Each optical detector 250 and 260 may include two diodes that are biased and interconnected such that their two currents subtract from one another].

Figure 3:
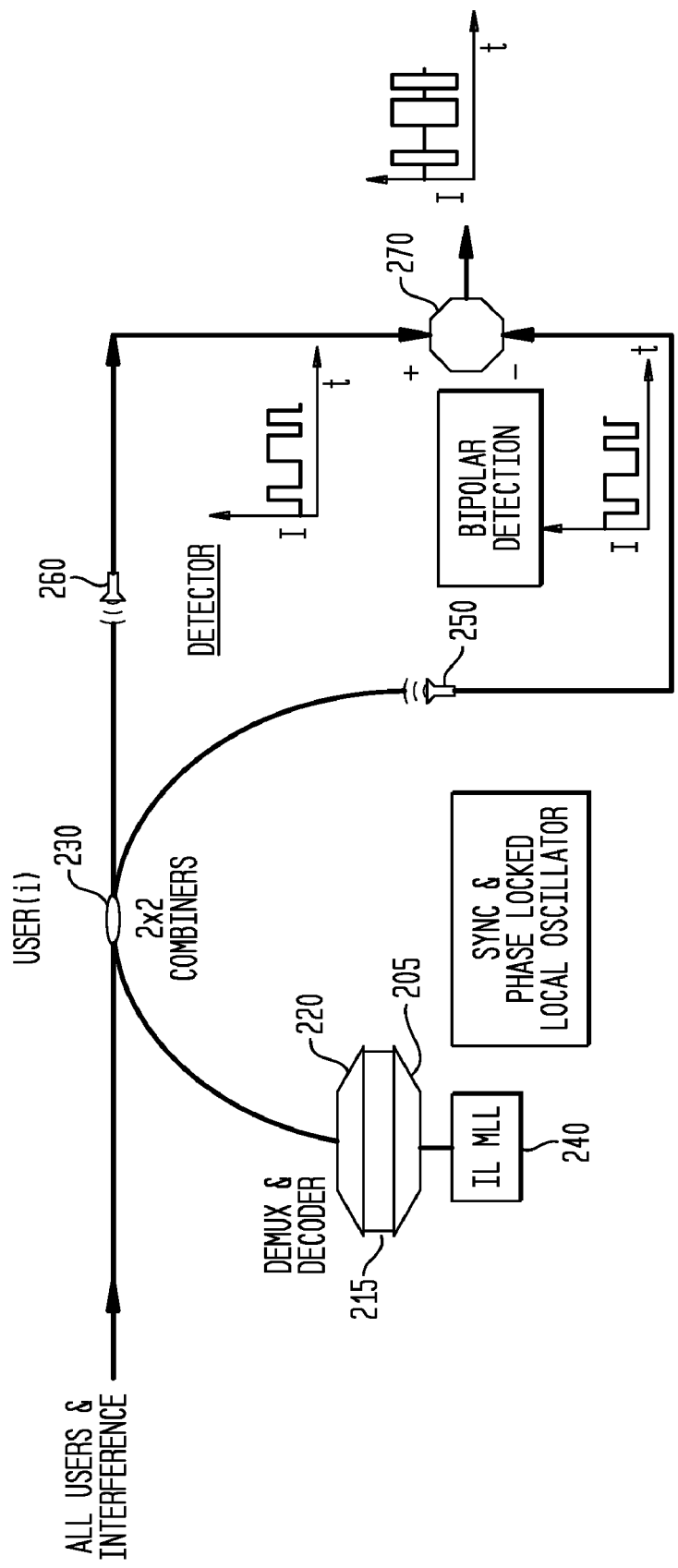
FIG. 3 illustrates a receiver in accordance with an aspect of the invention.
Figure 4:
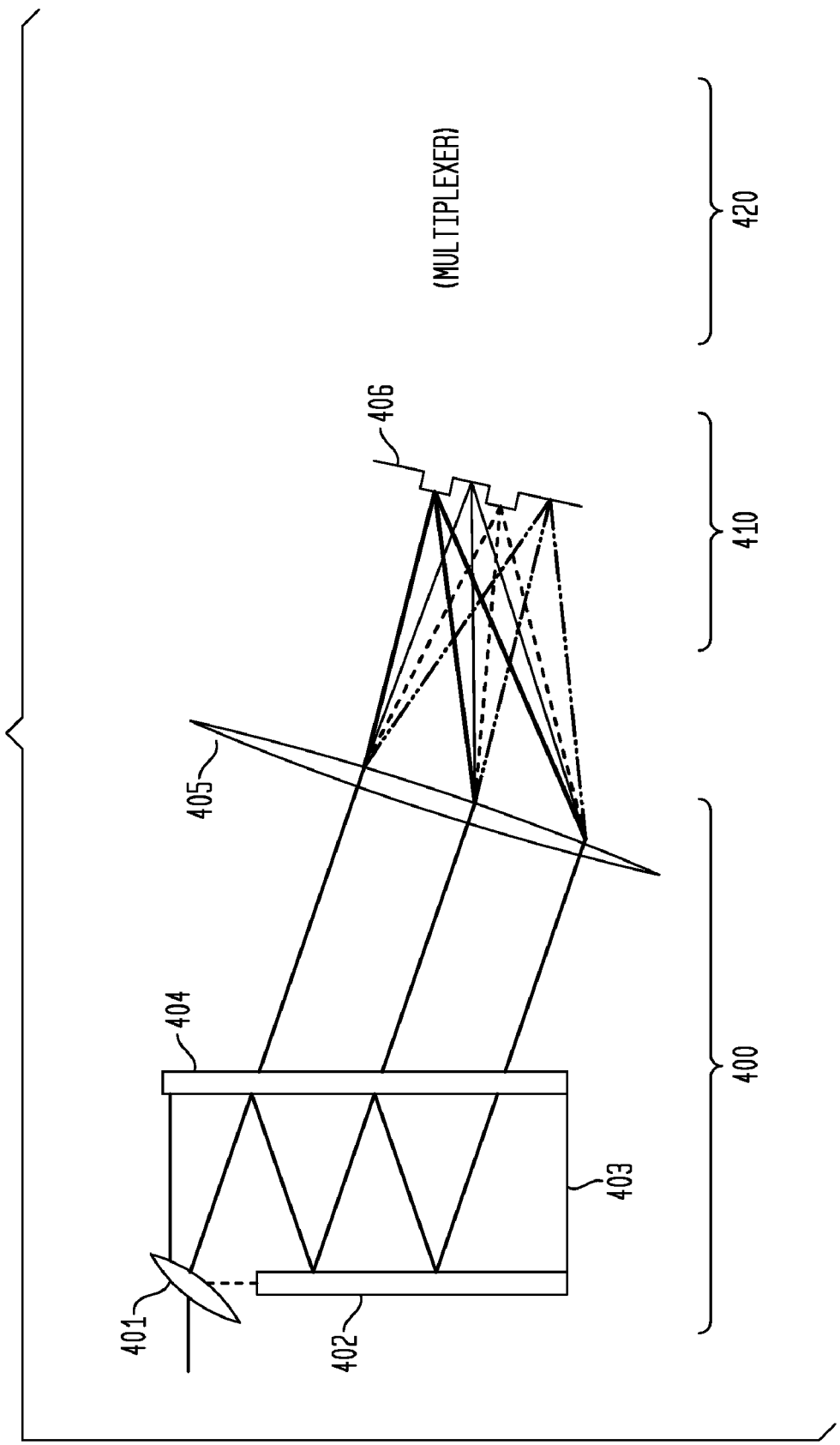
FIG. 4 illustrates a demultiplexer, encoder/decoder, multiplexer in accordance with an aspect of the invention.

FIG. 3 is another example of receiver 300. Unlike the receiver 200 of FIG. 2, in receiver 300 of FIG. 3 the pulse signal from LO laser 240 is demultiplexed, encoded to match one of the codes in the incoming ensemble of encoded signals, and multiplexed by demultiplexer 205, encoder 215, and multiplexer 220 whose operation will be described below with regard to FIG. 4. In receiver 300, an appropriately phased, polarized, time-aligned and encoded LO optical signal is combined in a 2×2 combiner 230 with the ensemble of incoming encoded signals. As described below, the desired signal is effectively gated or separated from the other undesired channels when the two signal are combined. The outputs of combiner 230 are input to balanced optical detectors 250 and 260. The outputs of optical detectors 250 and 260 are subtracted from one another in element 270. For orthogonal Hadamard codes, the temporal integral over the bit period of the product of the electric fields of the incoming signals and encoded LO signal is maximal for the desired channel and nulled for the undesired channels. An integrate-and-dump electrical receiver or a receiver with suitable low-pass electrical filtering allows the detection of the desired channel and the rejection of the multi-user interference from other channels. Again, no OTG is required for this receiver configuration FIG. 4 shows an example of a demultiplexer 400, encoder/decoder 410, multiplexer 420 in accordance with an aspect of the invention. There are other means for demultiplexing, encoding/decoding, multiplexing a signal and the following is merely an example of one such means. As shown in FIG. 4, an optical signal enters a collimated lens 401. The optical signal passes through space 403 toward a gradient reflective coating 404. Space 403 may be an air gap or it may be filled with a glass substrate. Gradient reflective coating 404 is a metallic coating like silver or aluminum which is highly-reflective/low-transmissive near the collimating lens (where the light is bright) and tapers off to low-reflectance/high-transmittance further from the lens. The intention is that each bounce should transmit an equal amount of light. The coating 404 allows a portion of the optical signal to pass through and reflects the other portion through space 403 toward a 100% reflective material.

The portion(s) of the optical signal that passes through coating 404 are directed toward a Fourier lens 405. Fourier lens 405 converts the incoming signal into the frequency domain and directs the converted signal onto a reflective phase mask 416 as shown in FIG. 4.

Reflective phase mask 416 corresponds to the encoded signal. In FIG. 2, the decoder 210 would have a phase mask 416 that is a phase conjugate of the phase mask applied when the signal was encoded. In FIG. 3, the encoder 215 would have a phase mask 416 similar to the phase mask used to encode the optical signal.

Turning now to FIG. 5, there is shown a schematic of another demultiplexer, encoder/decoder, multiplexer that can be used in the detectors of FIGS. 2 and 3 in accordance with an aspect of the present invention. The unit 500 comprises a first grating 510, a phase mask 520 and a second grating 530. The phase mask is illustrated as having eight sections, one for each wavelength, mode or frequency bin comprising a beam of light 524. The beam of light 524 enters the first grating 510 and is spatially distributed based on the different wavelengths or frequency bins that comprise the light beam 524. This spatial distribution preferably results in each mode being limited to a predetermined section ($520_1$ through $520_8$) of the phase mask 520. The phase mask 520 spectrally encodes/decodes the beam 524 and passes the encoded/decoded signal to the grating 530. The second grating 530 then spatially recombines the bins into an encoded/decoded beam 536.

The receiver 200 of FIG. 2 has many advantages that make it suitable for use as a coherent gated receiver. In receiver 200, the optically decoded signal is multiplied by unmodulated unencoded MLL pulses to effectively extract the gated signal. Receiver 200 only requires 1 2×2 combiner and 2 balanced detectors and electrical "subtraction" rather then a 2×2 combiner and a pair of detectors per frequency bin and avoids the need to balance the optical path lengths of the these several optical paths thereby reducing the complexity of the receiver. Both types of coherent receivers are sensitive to phase (and polarization) between LO and received fields (comparable to more complex coherent detector). In comparison to usual spectral-phase encoded OCDMA receivers, this approach eliminates the need for an optical time gate (OTG) to separate the desired signal from the other user signals. The coherent detection process effectively performs the gating function.

The receiver 300 of FIG. 3 also has the same advantages of receiver 200. Additionally, it has the added advantage of less degradation of the received encoded optical signal since the encoded optical signal is not subjected to another decoding step.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed:

1. A coherent gated receiver for optical code division multiple access (OCDMA) comprising:
   a decoder operable to receive an optical signal comprising multiple encoded channels and generate a decoded optical signal, the decoder comprises a an optical demultiplexer operable to spatially distribute the spectral content of the received optical signal, a phase mask operable to decode the spatially distributed optical signal, and a multiplexer operable to combine the decoded spatially distributed optical signal;
   a laser source operable to provide a pulse signal with phase-locked frequency components matching frequency components in the received signal;
   a combiner coupled to the laser source and the decoder operable to combine the decoded optical signal and the pulse signal; and
   a detector operable to detect an output from the combiner.

2. The coherent gated receiver according to claim 1, wherein the optical signal is spatially distributed by frequency.

3. The coherent gated receiver according to claim 1, wherein the laser source is a mode locked laser with phase-locked frequency components matching frequency components in the received signal.

4. The coherent gated receiver according to claim 1, further comprising a second detector operable to detect an output from the combiner.

5. The coherent gated receiver according to claim 4, wherein the output of the detector and the second detector are subtracted from each other to generate a signal.

6. The coherent gated receiver according to claim 1, wherein the combiner is 2×2 combiner.

7. A coherent gated receiver comprising:
   a laser source operable to provide a pulsed signal with phase-locked frequency components matching frequency components in the transmitted signal;
   an encoder coupled to the laser source and operable to encode the pulse signal, the encoder comprises, a demultiplexer operable to spatially distribute the pulse signal, a phase mask operable to encode the spatially distributed pulse signal, and a multiplexer operable to combine the encoded spatially distributed pulse signal;
   a combiner operable to combine the encoded pulse signal and an optical signal; and
   a detector operable to detect an output from the combiner.

8. The coherent gated receiver according to claim 7, wherein the pulse signal is spatially distributed by frequency.

9. The coherent gated receiver according to claim 7, wherein the laser source is a mode locked laser with phase-locked frequency components matching those in the received signal.

10. The coherent gated receiver according to claim 7, further comprising a second detector operable to detect an output from the combiner.

11. The coherent gated receiver according to claim 10, wherein the output of the detector and the second detector are subtracted from each other to generate an signal.

12. The coherent gated receiver according to claim 7, wherein the combiner is 2×2 combiner.

* * * * *